(12) United States Patent
Carletti

(10) Patent No.: US 6,561,724 B1
(45) Date of Patent: May 13, 2003

(54) SAFETY CONNECTING AND HOOKING DEVICE FOR TUBULAR ELEMENTS, PARTICULARY FOR STRETCHER

(75) Inventor: Enrico Carletti, Bologna (IT)

(73) Assignee: Ferno Washington Italia S.R.L. (IT)

( * ) Notice: Subject to any disclaimer, the term of this patent is extended or adjusted under 35 U.S.C. 154(b) by 0 days.

(21) Appl. No.: 10/019,454

(22) PCT Filed: Apr. 28, 2000

(86) PCT No.: PCT/IB00/00547
§ 371 (c)(1),
(2), (4) Date: Oct. 24, 2001

(87) PCT Pub. No.: WO00/66897
PCT Pub. Date: Nov. 9, 2000

(30) Foreign Application Priority Data

Apr. 28, 1999 (IT) ......................................... BO99A0202

(51) Int. Cl.⁷ ............................................... B25G 3/18
(52) U.S. Cl. ..................... 403/315; 403/321; 403/325; 403/322.4; 403/326
(58) Field of Search .................. 403/49, 229, 315–320, 403/321, 322.1, 322.4, 325, 327, 329, 330, 341, DIG. 4, DIG. 14, 292, 294, 326; 24/DIG. 52; 63/3, 3.1; 292/128, 228

(56) References Cited

U.S. PATENT DOCUMENTS

| 1,868,508 A | | 7/1932 | Stewart | |
| 2,845,307 A | * | 7/1958 | Holmes | ........................ 403/49 |
| 3,643,988 A | * | 2/1972 | Ingvartsen | .................... 403/49 |
| 3,653,079 A | * | 4/1972 | Bourgraf et al. | ........ 403/325 X |
| 4,643,388 A | * | 2/1987 | Tazawa | ..................... 403/49 X |
| 5,217,315 A | | 6/1993 | Rosane | |

FOREIGN PATENT DOCUMENTS

| DE | 633617 | 8/1936 |
| NL | 1007073 | 3/2000 |

* cited by examiner

*Primary Examiner*—Gregory J. Binda
*Assistant Examiner*—Victor MacArthur
(74) *Attorney, Agent, or Firm*—Killworth, Gottman, Hagan & Schaeff, L.L.P.

(57) ABSTRACT

A safety connecting and hooking device for tubular elements, first (2a) and second (2b), particularly for stretcher, includes: a female element (3) whose first end is connected to said first tubular element (2a) and whose second free end has a seat (5) transversally crossed by a hooking pivot (4); a male element (6) whose first end is connected to said second tubular element (2b) and whose second free end has a bracket (7) detachably insertable complementary into said seat (5) of said female element (3), said bracket (7) having the head with a recess (8) in order to house partially said hooking pivot (4); a hook (10) hinged to said male element (6) and detachably insertable, in correspondence of a hooking condition (A) of said tubular elements (2a, 2b), into a slot (9) carried out longitudinally in the bracket (7) for closing partially the opening part of said bracket (7) around said hooking pivot (4); a safety hook (15) hinged to said female element (3) and whose hooking end is fit to engage a hollow (11) of said bracket (7) in correspondence of said hooking condition (A).

16 Claims, 1 Drawing Sheet

SAFETY CONNECTING AND HOOKING DEVICE FOR TUBULAR ELEMENTS, PARTICULARY FOR STRETCHER

TECHNICAL FIELD

This invention relates to medical devices to be used in first aid emergency situations for immobilizing and carrying the traumatized and/or injured persons.

The invention refers particularly to a safety connecting and hooking device for tubular elements, particularly for scoop stretcher to pick up the patients laying on the ground without any risk of more possible trauma.

BACKGROUND OF THE INVENTION

The known scoop stretchers essentially comprise two half-stretchers detachably connected near to their ends by means of articulated hooking devices.

The know hooking devices essentially comprise a female part, including a "U" shaped seat transversally crossed in a substantially central position by a hooking pivot, and a male part with a bracket which is complementarily inserted into the "U" shaped seat. The head of the bracket is provided with a notch fit for partially housing the pivot pin and fit to be closed as eyelet by a hook member co-operating therewith in order to "hook" the pivot pin. This hook member is pivotally connected to the bracket and is kept in the eyelet-closure condition by a return spring.

The main drawback of the known connection and coupling devices for stretchers is that they can be accidentally opened, with very serious consequence for the supported patient, for example, when the stretcher is handled by the operators particularly in narrow environments (ditch, inside the vehicles, etc.) or in situations hurried up by the emergency and quickness of the action.

DISCLOSURE OF THE INVENTION

The main object of the present invention is to propose a device having safety means to prevent the opening and then the accidental unhooking of the device.

Further object is to propose a device which can be simply and easily made, installed and maintained.

DESCRIPTION OF THE DRAWINGS

The features of the invention will be highlighted referring to the enclosed drawings, in which.

BEST MODE FOR CARRYING OUT THE INVENTION

Figure 1:
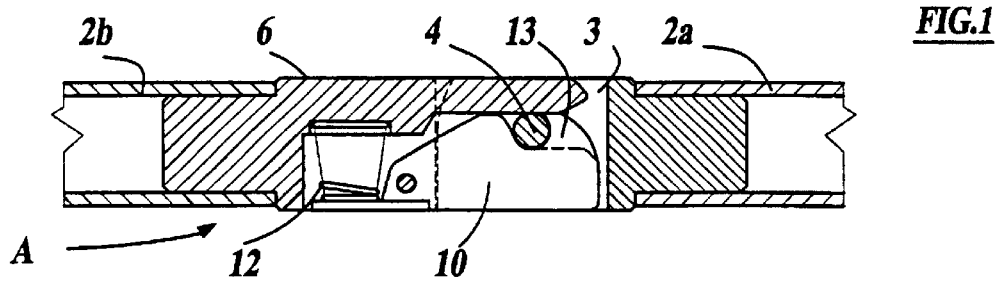
FIG. 1 shows a top sectional view of the safety connecting and hooking device of present invention.
Figure 2:
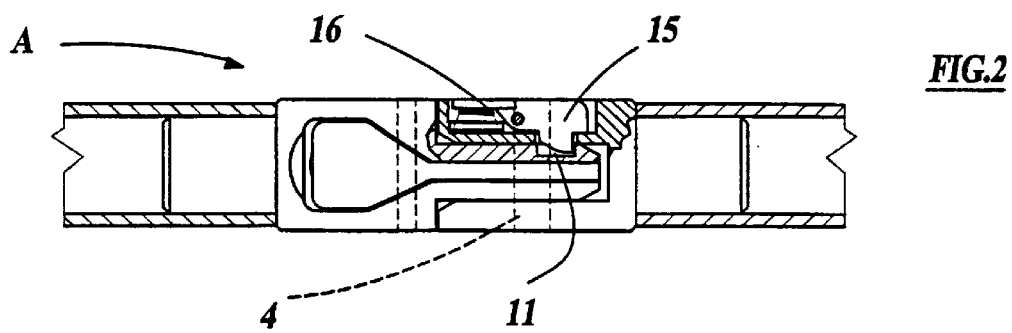
FIG. 2 shows a partially sectioned side view of the device in FIG. 1.

Referring to FIGS. from 1 to 4, numeral 1 indicates a safety connecting and hooking device for tubular elements of a not shown scoop-stretcher, whose two tubular elements, first 2a and second 2b, are connected by means of the device 1.

The device 1 comprises essentially a female element 3, a male element 6, a hook 10 and a safety hook 15.

Figure 3A:
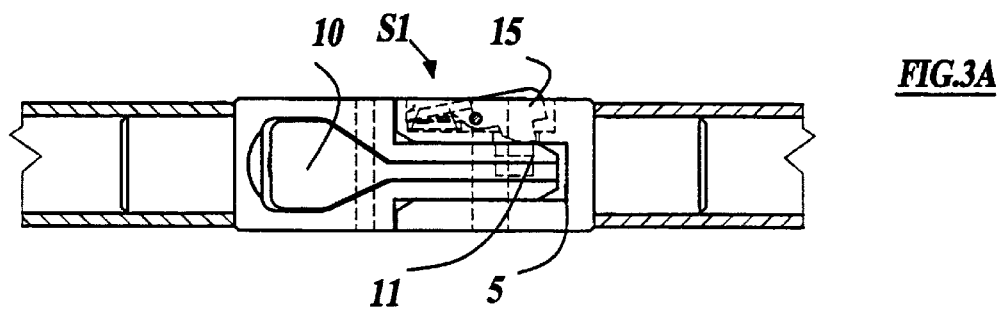
FIGS. 3A and 3B show respectively the side and top view of two partial disconnecting conditions of the device in FIG. 1.

The female element 3 includes a first end rotationally coupled to the first tubular element 2a and the second free end having a "U" shaped seat 5, horizontally laying as in FIG. 3A, and transversally crossed by a hooking pivot 4, perpendicularly and centrally fixed to the parallel walls of the female element 3.

The male element 6 includes a first end rotationally coupled to the second tubular element 2b, while the second free end has a bracket 7 detachably insertable, almost complementarily, into the seat 5 of the female element 3. The head of the bracket 7 has a recess 8, almost "C" shaped, for partially housing the hooking pivot 4.

The hook 10 is pivoted to the male element 6 in such a way to be coplanar with the related side surface of the device 1 and is insertable into a slot 9 carried out longitudinally in the bracket 7, in correspondence of a hooking condition A of the tubular elements 2a and 2b, so partially closing the recess 8 of the bracket 7 carrying out an eyelet around the hooking pivot 4.

The hook 10 is provided with a crook 13 carried out in its end facing the female element 3 for engaging the hooking pivot 4.

A first elastic element 12, for instance an elastic spring, is interposed between the free end of the hook 10 and a related housing in the male element 6.

The safety hook 15 is hinged to one of the external and parallel surfaces of the female element 3, and a second elastic element 16, for instance a spring, is set between the free end of the hook 15, facing the male element 6, and a related seat carried out in the female element 3.

The hook end of the safety hook 15 is fit to engage a hollow 11, carried out in the bracket 7 of the male element 6, in correspondence of the hooking condition A.

A variant of the device 1 has the hollow 11 carried out also in the hook 10 so that the safety hook 15 stops contemporarily the hook 10 and the bracket 7 of the male element 6.

Figure 3B:
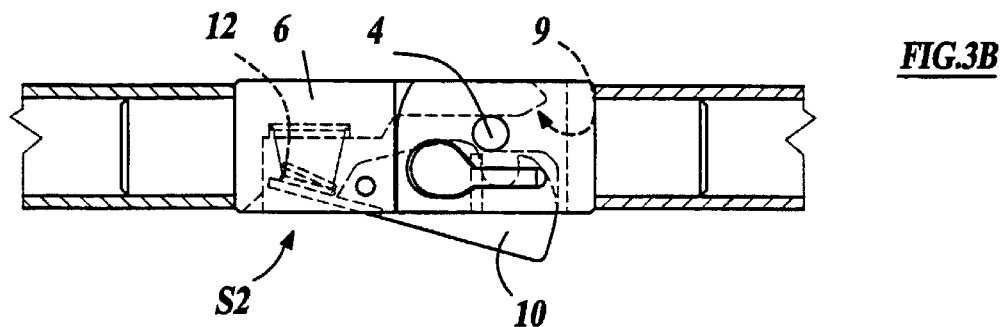
Figure 4:
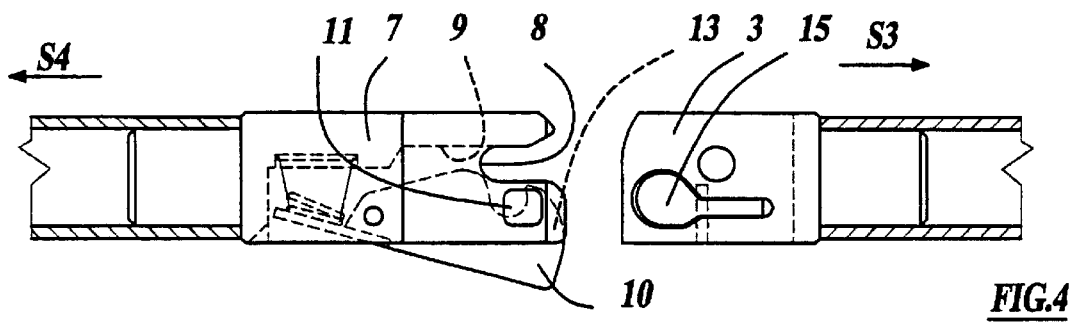
FIG. 4 shows a top view of the stretcher hook in FIG. 1 in an uncoupling condition.

Now referring to FIGS. 3A, 3B and 4, the operating procedures of said device 1 are very simple, namely, starting from the hooking condition A, in which the bracket 7 is inserted between the parallel walls of the "U" shaped female element until the crook 13 of the hook 10 engages the pivot 4, closing the eyelet around the pivot 4, while the tip of the safety hook 15 is engaged with the hollow 11 to stop furthermore the disconnection of the bracket 7 from the female element 3.

Now the operator, in order to uncouple the tubular 2a and 2b has to press the free end of the safety hook 15, according to the arrow S1 in FIG. 3A, overcoming the elastic reaction of the second spring 16, so disconnecting the tip of the safety hook 15 from the hollow 11. Then the operator must press the free end of the hook 10, according to the arrow S2 in FIG. 3B, overcoming the elastic reaction of the first spring 12, in order to disengage the crook 13 of the hook 10 from the pivot 4.

The tubular elements, first 2a and second 2b, hence can be uncoupled moving them according to the arrows S3 and S4 in FIG. 4 because neither the bracket 4 and the hook 10 are connected to the pivot 4, nor the tip of the safety hook 15 interferes with the hollow 11.

The two tubular elements 2a and 2b remain connected even if the hook 10 is uncoupled from the pivot 4, since the complete disconnection of the two tubular elements is carried out only if both the hook 10 and the safety hook 15 are uncoupled respectively from the pivot 4 and the hollow 11.

Even more, in the variant of the device 1, the uncoupling of the hook 10 from the pivot 4 can not happen before the safety hook 15 is completely disengaged from the hollow 11, carried out in the bracket 7 and in the hook 10, so preventing the accidental uncoupling of the hook 10 from the pivot 4.

It is very important to specify that said connecting and hooking device 1 is carried out not only for connecting the tubular elements of two half-stretchers of a spoon stretcher, but also for connecting the heads of two tubular elements in order to allow the uncoupling, even if they are subjected to torsion and/or flexion, and anyway said device avoids the accidental uncoupling.

The main advantage of the present invention is to provide a safety connecting and hooking device for a stretcher which can allow the coupling/uncoupling of the two tubular elements of the scoop stretcher also in correspondence of flexion and/or torsion conditions on the stretcher portions disclosed in the present invention, and can avoid the device opening and then the accidental uncoupling of the two tubular elements of the stretcher.

Further advantage is to provide a safety connecting device of simple production, at low cost and with high level of reliability.

What is claimed is:

1. A safety connecting and hooking device for first and second tubular elements of a stretcher, comprising:
   a female element whose first end is connected to said first tubular element and whose second free end has a seat transversally crossed by a hooking pivot;
   a male element whose first end is connected to said second tubular element and whose second free end has a bracket detachably insertable complementarily into said seat of said female element, said bracket having a recess for housing partially said hooking pivot;
   a hook hinged to said male element and adapted to be detachably insertable, in correspondence to a hooking condition of said tubular elements, into a slot provided longitudinally in said bracket for engaging said hooking pivot; and
   a safety hook hinged to said female element and adapted to engage a hollow of said bracket in correspondence to said hooking condition, said hollow is also provided in said hook thereby permitting said safety hook to simultaneously engage said hook and said bracket in said hooking condition.

2. The device according to claim 1 wherein said hook is maintained in said hooking condition by a first elastic element set between said hook and said male element.

3. The device according to claim 1 wherein said safety hook is maintained in said hooking condition by a second elastic element set between said safety hook and said female element.

4. The device according to claim 1 wherein said first end of said female element is rotationally connected with said first tubular element.

5. The device according to claim 1 wherein said first end of said male element is rotationally connected with said second tubular element.

6. A safety connecting and hooking device for first and second tubular elements, comprising:
   a female element having a first end adapted to be connected to said first tubular element and a second end providing a hooking pivot;
   a male element having a first end adapted to be connected to said second tubular element and a second end providing a recess for housing partially said hooking pivot;
   a hook hinged to said male element and adapted to be detachably engagable with said hooking pivot in correspondence to a hooking condition of said tubular elements; and
   a safety hook hinged to said female element and adapted to engage a hollow of said male element in correspondence to said hooking condition.

7. The device according to claim 6 wherein said hook is maintained in said hooking condition by a first elastic element set between said hook and said male element.

8. The device according to claim 6 wherein said safety hook is maintained in said hooking condition by a second elastic element set between said safety hook and said female element.

9. The device according to claim 6 wherein said first end of said female element is rotationally connected with said first tubular element.

10. The device according to claim 6 wherein said first end of said male element is rotationally connected with said second tubular element.

11. The device according to claim 6 wherein said hollow is also provided in said hook thereby permitting said safety hook to simultaneously engage said hook and said male element.

12. A safety connecting and hooking device for first and second tubular elements, comprising:
    a female element having a first end adapted to be connected to said first tubular element and a second end providing a hooking pivot;
    a male element having a first end adapted to be connected to said second tubular element and a second end having a bracket adapted to partially house said booking pivot and providing a cavity;
    a hook hinged to said male element and adapted to be detachably engagable with said hooking pivot in correspondence to a hooking condition of said tubular elements; and
    a safety hook hinged to said female element and adapted to extend through said cavity of said bracket to engage a hollow of said hook in said hooking condition.

13. The device according to claim 12 wherein said hook is maintained in said hooking condition by a first elastic element set between said hook and said male element.

14. The device according to claim 12 wherein said safety hook is maintained in said hooking condition by a second elastic element set between said safety hook and said female element.

15. The device according to claim 12 wherein said first end of said female element is rotationally connected with said first tubular element.

16. The device according to claim 12 wherein said first end of said male element is rotationally connected with said second tubular element.

* * * * *